(12) United States Patent
Matsuda et al.

(10) Patent No.: US 7,879,450 B2
(45) Date of Patent: Feb. 1, 2011

(54) METHOD FOR PREPARING SILICONE RUBBER/FLUOROELASTOMER INTEGRATED RUBBER ARTICLE

(75) Inventors: Takashi Matsuda, Annaka (JP); Mikio Shiono, Annaka (JP); Takeshi Hashimoto, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 617 days.

(21) Appl. No.: 11/711,659

(22) Filed: Feb. 28, 2007

(65) Prior Publication Data

US 2007/0205533 A1    Sep. 6, 2007

(30) Foreign Application Priority Data

Mar. 1, 2006    (JP) ............... 2006-054797

(51) Int. Cl.
*B32B 9/04* (2006.01)
*C08G 77/24* (2006.01)

(52) U.S. Cl. ............ 428/447; 428/448; 528/42

(58) Field of Classification Search .......... 428/447, 428/448
See application file for complete search history.

(56) References Cited

U.S. PATENT DOCUMENTS

| | | | |
|---|---|---|---|
| 2,823,218 A | 2/1958 | Speier et al. | |
| 2,970,150 A | 1/1961 | Bailey et al. | |
| 3,159,601 A | 12/1964 | Ashby | |
| 3,159,662 A | 12/1964 | Ashby | |
| 3,516,946 A | 6/1970 | Modic | |
| 3,775,452 A | 11/1973 | Karstedt | |
| 3,814,780 A | 6/1974 | Woodhall | |
| 5,665,846 A | 9/1997 | Sato et al. | |
| 6,297,339 B1 * | 10/2001 | Osawa et al. | 528/15 |
| 6,512,041 B2 | 1/2003 | Osawa et al. | |
| 2005/0288474 A1 * | 12/2005 | Matsuda et al. | 528/32 |

FOREIGN PATENT DOCUMENTS

| | | |
|---|---|---|
| JP | 8-176446 A | 7/1996 |
| JP | 2990646 B2 | 10/1999 |
| JP | 3573191 B2 | 7/2004 |
| JP | 3633836 B2 | 1/2005 |
| JP | 2005-246950 A | 9/2005 |
| JP | 2005-248148 A | 9/2005 |
| JP | 2005-248149 A | 9/2005 |
| JP | 2005-248150 A | 9/2005 |
| JP | 2005-290330 A | 10/2005 |

OTHER PUBLICATIONS

English language machine-translation of JP 2005-246950, 20 pages, translation generated Aug. 2010.*
Japanese Office Action for Application No. 2006-054797, dated Jul. 28, 2010.

* cited by examiner

*Primary Examiner*—Randy Gulakowski
*Assistant Examiner*—Robert Loewe
(74) *Attorney, Agent, or Firm*—Birch Stewart Kolasch & Birch, LLP

(57) ABSTRACT

A rubber article is manufactured by heat curing a heat-curable silicone rubber composition filled with untreated fumed silica to form a substrate, applying a primer composition comprising a fluoroalkylene or fluoropolyether compound having at least one alkenyl radical and at least one hydrolyzable silyl radical onto the substrate surface, and disposing a heat-curable perfluoropolyether elastomer composition thereon and curing the composition for integration. The integrally molded article has characteristics of both silicone rubber and fluoroelastomer.

12 Claims, 1 Drawing Sheet

METHOD FOR PREPARING SILICONE RUBBER/FLUOROELASTOMER INTEGRATED RUBBER ARTICLE

CROSS-REFERENCE TO RELATED APPLICATION

This non-provisional application claims priority under 35 U.S.C. §119(a) on Patent Application No. 2006-054797 filed in Japan on Mar. 1, 2006, the entire contents of which are hereby incorporated by reference.

TECHNICAL FIELD

This invention relates to a method for preparing a rubber article in which a molded silicone rubber is integrated with a cured product of a perfluoropolyether fluoroelastomer composition having excellent solvent resistance, chemical resistance, heat resistance and low-temperature property.

BACKGROUND ART

Since vinylidene fluoride base fluororubbers are elastomers with excellent heat resistance, chemical resistance and mechanical strength, they are used in the industry over a wide variety of fields including automobiles and machinery.

However, their chemical resistance is rather insufficient in that they are readily swollen in polar solvents such as ketones, lower alcohols, carbonyl and organic acids, and degraded with amine chemicals, resulting in extraordinary losses of rubber strength and elongation. As to the low-temperature property, fluororubbers lose rubber elasticity at temperatures below −20° C., so that they serve no longer as sealing members. In general, their use in cold latitudes is limited.

For obviating these drawbacks, Japanese Patent Nos. 2990646, 3573191 and 3633836 disclose fluorinated curable compositions of liquid or millable type primarily comprising a perfluoro compound and a fluorinated organohydrogenpolysiloxane. However, molded parts of these fluorinated curable compositions are most often expensive because they are difficult to blend with inexpensive rubber of different species. They are thus limited in use or application.

With respect to rubber physical properties and workability, some other species rubbers are excellent. Specifically, the fluororubbers are surpassed by silicone rubbers in rubber strength, elongation, compression set, roll workability and mold release.

Since the fluorinated curable composition has the prominent features of solvent resistance and chemical resistance, it is sometimes preferred for those articles which are partially contacted with solvents or chemicals that only a contacting portion be made of the fluorinated curable composition and the remaining portion be made of another species rubber.

DISCLOSURE OF THE INVENTION

An object of the invention is to provide a method for preparing a rubber article in an integral molding fashion by joining together a molded silicone rubber and a cured product of a perfluoropolyether fluoroelastomer composition, the rubber article having excellent solvent resistance, chemical resistance, heat resistance and low-temperature property of the cured fluoroelastomer composition as well as advantageous properties of the silicone rubber.

As the method for bonding and integral molding of silicone rubber and perfluoropolyether fluororubber, the inventors previously proposed JP-A 2005-248148, JP-A 2005-246950, JP-A 2005-248149, and JP-A 2005-248150.

Specifically, JP-A 2005-248148 discloses a method for preparing an integrally molded article by co-vulcanization of an unvulcanized silicone rubber of heat-curable type and an unvulcanized perfluoropolyether fluororubber of heat-curable type.

JP-A 2005-246950 discloses a method of laminating a heat-curable perfluoropolyether fluororubber onto a molded silicone rubber part.

In JP-A 2005-248149 and JP-A 2005-248150, a molded silicone rubber part and a molded perfluoropolyether fluororubber part are joined with a liquid silicone adhesive of condensation crosslinking type.

There is still a need for a method of firmly integrating silicone rubber with fluoroelastomer, especially a method of preparing a rubber article having improved dimensional stability, which is especially suited for the manufacture of thin film worked articles.

The inventors have found that an integrated rubber article can be manufactured by heat curing a substrate-forming composition comprising a heat-curable silicone rubber composition and untreated fumed silica to form a substrate, applying a primer composition comprising a fluoroalkylene or fluoropolyether compound having at least one alkenyl radical and at least one hydrolyzable silyl radical in the molecule onto a surface of the substrate, applying thereon a heat-curable perfluoropolyether elastomer composition, and curing the composition for integration so that the fluoroelastomer is closely bonded to the silicone rubber substrate.

Accordingly, the present invention provides a method for preparing a rubber article, comprising the steps of heat curing a substrate-forming composition (a) comprising 100 parts by weight of a heat-curable silicone rubber composition and 0.5 to 50 parts by weight of untreated fumed silica to form a substrate, applying a primer composition (b) comprising a fluoroalkylene or fluoropolyether compound having at least one alkenyl radical and at least one hydrolyzable silyl radical in the molecule onto a surface of the substrate, and disposing thereon a heat-curable perfluoropolyether elastomer composition (c) and curing the composition for integration.

In a preferred embodiment, the silicone rubber substrate is formed by molding and curing the substrate-forming composition (a) comprising a heat-curable silicone rubber composition and untreated fumed silica, said silicone rubber composition comprising a diorganopolysiloxane having the average compositional formula (I):

$$(R^{11})_a SiO_{(4-a)/2} \tag{I}$$

wherein $R^{11}$ is a substituted or unsubstituted monovalent hydrocarbon radical, and a is a number in the range: $1.95 \leq a \leq 2.05$, 0.01 to 15 mol % of entire silicon-bonded $R^{11}$ radicals being a monovalent aliphatically unsaturated hydrocarbon radical.

Also preferably, in the primer composition (b), the fluoroalkylene or fluoropolyether compound having at least one alkenyl radical and at least one hydrolyzable silyl radical in the molecule has the general formula (1):

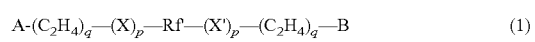
$$A\text{-}(C_2H_4)_q\text{—}(X)_p\text{—}Rf\text{—}(X')_p\text{—}(C_2H_4)_q\text{—}B \tag{1}$$

wherein A is —CH=CH$_2$, B is a hydrolyzable silyl radical, X and X' are each independently a divalent linking radical, X is —CH$_2$—, —CH$_2$O—, —CH$_2$OCH$_2$— or —Y—NR—CO— wherein Y is —CH$_2$— or a radical of the following structural formula (Z):

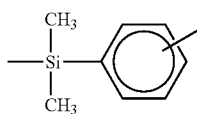

(Z)

(inclusive of o-, m- and p-positions) and $R^1$ is hydrogen, methyl, phenyl or allyl, X' is —$CH_2$—, —$OCH_2$—, —$CH_2OCH_2$— or —CO—$NR^2$—Y'— wherein Y' is —$CH_2$— or a radical of the following structural formula (Z'):

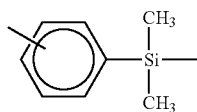

(Z')

(inclusive of o-, m- and p-positions) and $R^2$ is hydrogen, methyl, phenyl or allyl, p is independently 0 or 1, q is independently 0 or 1, and Rf is a fluoroalkylene or fluoropolyether-containing radical.

In a preferred embodiment, the heat-curable perfluoropolyether elastomer composition (c) comprises a polymer having at least two alkenyl radicals in the molecule and a perfluoropolyether structure in the backbone, a compound having at least two SiH radicals in the molecule, and a platinum group catalyst.

BENEFITS OF THE INVENTION

Rubber articles in which an uncured perfluoropolyether fluororubber composition is integrally molded on a molded silicone rubber part have a consistent interface between two rubbers and an improved dimensional accuracy and is of great worth in the industry.

BRIEF DESCRIPTION OF THE DRAWING

The only figure.

DESCRIPTION OF THE PREFERRED EMBODIMENT

Figure 1:
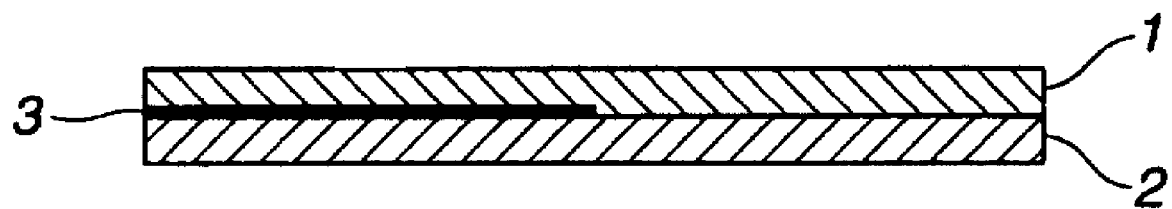
FIG. 1 is a schematic cross-sectional view of an integrally molded article for test manufactured in Examples.

The singular forms "a," "an" and "the" include plural referents unless the context clearly dictates otherwise.

According to the invention, a rubber article is manufactured by molding and heat curing a substrate-forming composition (a) comprising a heat-curable silicone rubber composition and untreated fumed silica to form a substrate, applying a primer composition (b) comprising a fluoroalkylene or fluoropolyether compound having at least one alkenyl radical and at least one hydrolyzable silyl radical in the molecule onto the substrate surface, and applying thereon a heat-curable perfluoropolyether elastomer composition (c) as a layer and curing the composition for integration. As used herein, the term "substrate" refers to a molded part or member obtained by molding and heat curing the substrate-forming composition (a) and is sometimes also interchangeable with cured silicone rubber.

Compositions (a), (b) and (c) are described in detail.

Substrate-Forming Composition (a)

A silicone rubber substrate is a cured product obtained by compounding untreated fumed silica in a conventional uncured silicone rubber composition to provide a substrate-forming composition (a) and molding the composition by pressing or hot air vulcanization (HAV). Any desired crosslinking system and working technique may be used.

The term "silicone rubber" as used herein is described in "Silicone Handbook," Kunio Ito Ed., Nikkan Kogyo Co., Ltd., Aug. 31, 1990, especially Chap. 9 'Silicone Rubber', Chap. 10 'Liquid Silicone Rubber', Chap. 11 'Modified Silicone Rubber', Chap. 15 'Fluorosilicone Rubber', and most often Chap. 9 'Silicone Rubber' and Chap. 15 'Fluorosilicone Rubber'. The silicone rubbers encompass fluorosilicone rubbers.

First described is the silicone rubber composition to which untreated fumed silica has not been added. The silicone rubber compositions that form silicone rubber are generally of the peroxide crosslinking type using peroxides for curing and of the addition crosslinking type using a Si—H radical-containing compound and a platinum group metal catalyst for curing.

One typical silicone rubber composition is a composition comprising (A) a diorganopolysiloxane having the average compositional formula (I):

$$(R^{11})_a SiO_{(4-a)/2} \quad (I)$$

wherein $R^{11}$ is a substituted or unsubstituted monovalent hydrocarbon radical, and "a" is a number in the range: $1.95 \leq a \leq 2.05$, 0.01 to 15 mol % of entire $R^{11}$ radicals bonded to silicon atoms being a monovalent aliphatic unsaturated hydrocarbon radical, (B) a surface-treated reinforcing filler, and (C) a crosslinker.

The diorganopolysiloxane (A) contains at least two monovalent aliphatic unsaturated hydrocarbon radicals in the molecule and preferably has the average compositional formula (I):

$$(R^{11})_a SiO_{(4-a)/2} \quad (I)$$

wherein $R^{11}$ is a substituted or unsubstituted monovalent hydrocarbon radical, and "a" is a number in the range: $1.95 \leq a \leq 2.05$, 0.01 to 15 mol % of entire $R^{11}$ radicals bonded to silicon atoms being a monovalent aliphatic unsaturated hydrocarbon radical. If a proportion of aliphatic unsaturated hydrocarbon radical is less than 0.01 mol %, a cured product having sufficient tear strength may not be obtained in some cases. If the proportion is more than 15 mol %, a cured product may become brittle and insufficient in tear strength.

Suitable monovalent aliphatic unsaturated hydrocarbon radicals include alkenyl radicals of 2 to 8 carbon atoms such as vinyl and allyl, with vinyl being preferred. The preferred radicals represented by $R^{11}$ other than the aliphatic unsaturated hydrocarbon radicals are monovalent hydrocarbon radicals of 1 to 10 carbon atoms, more preferably 1 to 8 carbon atoms, for example, alkyl radicals such as methyl and ethyl, aryl radicals such as phenyl, aralkyl radicals such as benzyl, and substituted forms of the foregoing in which some or all hydrogen atoms are substituted by halogen atoms or the like, such as trifluoropropyl. Inter alia, methyl is preferred. The diorganopolysiloxane (A) may have a hydroxyl radical bonded to a silicon atom.

In average compositional formula (I), "a" is a number in the range: $1.95 \leq a \leq 2.05$. If "a" is less than 1.95, the resulting linear polymer may be unstable and liable to gel. If "a" is more than 2.05, high molecular weight polymers may form with difficulty.

In order that the cured product have sufficient mechanical strength, the diorganopolysiloxane (A) should preferably have a degree of polymerization of at least 1,000, more preferably at least 2,000, and most preferably 3,000 to 10,000.

Illustrative examples of the diorganopolysiloxane (A) include:

compounds having the general formula (II):

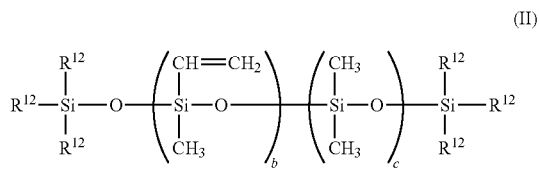
(II)

wherein b is an integer of at least 1, c is an integer of at least 1, b+c is preferably an integer of at least 1,000, more preferably an integer of at least 2,000, even more preferably an integer of 3,000 to 10,000, with the proviso that b and c have such values that a proportion of —CH=CH$_2$ radicals in all silicon-bonded organic radicals is in a range of 0.01 to 15 mol %, and R$^{12}$ which may be the same or different is a methyl, vinyl or hydroxyl radical;

compounds having the general formula (III):

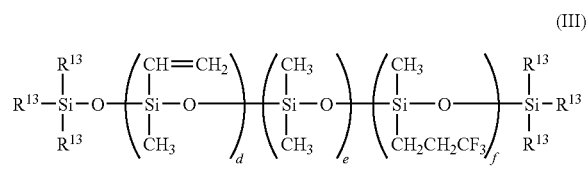
(III)

wherein d is an integer of at least 1, e is an integer of at least 1, f is an integer of at least 1, d+e+f is preferably an integer of at least 1,000, more preferably an integer of at least 2,000, even more preferably an integer of 3,000 to 10,000, with the proviso that d, e and f have such values that a proportion of —CH=CH$_2$ radicals in all silicon-bonded organic radicals is in a range of 0.01 to 15 mol %, and R$^{13}$ which may be the same or different is a methyl, vinyl, 3,3,3-trifluoropropyl or hydroxyl radical; and compounds having the general formula (IV):

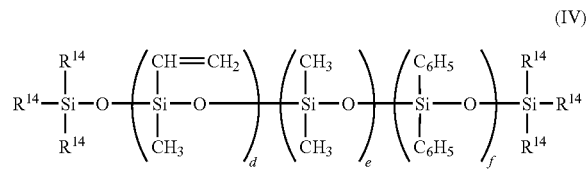
(IV)

wherein d is an integer of at least 1, e is an integer of at least 1, f is an integer of at least 1, d+e+f is preferably an integer of at least 2,000, even more preferably an integer of 3,000 to 10,000, with the proviso that d, e and f have such values that a proportion of —CH=CH$_2$ radicals is in a range of 0.01 to 15 mol %, and R$^{14}$ which may be the same or different is a methyl, vinyl, phenyl or hydroxyl radical.

Inter alia, the compounds of formula (II) are preferred.

The diorganopolysiloxane (A) may be prepared by well-known methods, for example, by (co)hydrolyzing one or more organohalosilanes, and subjecting the resulting cyclic polysiloxane (siloxane trimer or tetramer) to ring-opening polymerization in the presence of a basic or acidic catalyst.

The reinforcing filler (B) is to impart mechanical strength to the cured product and it has been surface treated to be hydrophobic. Suitable fillers include fumed silica, precipitated silica, fused silica, quartz flour, diatomaceous earth, aluminum silicate, titanium oxide, zinc oxide, iron oxide, alumina, calcium carbonate, zinc carbonate, and carbon black. Of these fillers, silica is preferably used to achieve sufficient reinforcement. Use is often made of silica having a specific surface area of at least 10 m$^2$/g, preferably at least 100 m$^2$/g, as measured by the BET method. Most preferably fumed silica and precipitated silica having a specific surface area of 100 to 400 m$^2$/g are used. The reinforcing fillers (B) impart mechanical strength to the cured product, while fillers of certain type impart electric conductivity and thermal conductivity as well.

Suitable surface treating agents with which the reinforcing filler (B) is treated include chlorosilanes such as (CH$_3$)$_3$SiCl, (CH$_3$)$_2$SiCl$_2$ and (CH$_3$)SiCl$_3$; alkoxysilanes such as CH$_2$=CHSi(OCH$_3$)$_3$, (CH$_3$)$_2$Si(OCH$_3$)$_2$ and CH$_3$Si(OCH$_3$)$_3$; organosilazanes such as (CH$_3$)$_3$SiNHSi(CH$_3$)$_3$; and silicone oils of the general formula:

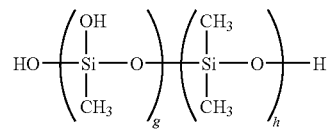

wherein g and h are numbers in the range: g>0, h>1, and 1<g+h<100. Surface treatment with these surface treating agents may be performed by standard techniques. Herein a small amount of water may be added for regulating or promoting the hydrolysis of the surface treating agent.

Component (B) is usually compounded in an amount of 5 to 200 parts by weight, preferably 10 to 100 parts by weight per 100 parts by weight of component (A). Outside the range, too less amounts of component (B) may lead to insufficient processability and fail to achieve sufficient reinforcement. Too much amounts of component (B) may detract from working efficiency and mold flow during processing and can rather reduce the mechanical strength of silicone rubber.

Component (C) may be any crosslinker which causes the silicone rubber composition to cure. Depending on the curing system, component (C) may be a combination of organohydrogenpolysiloxane with platinum group metal catalyst, or an organic peroxide.

When a combination of organohydrogenpolysiloxane with platinum group metal catalyst is used as component (C), an organohydrogenpolysiloxane having at least two Si—H radicals in the molecule is used. Its structure may be either linear, cyclic or branched. Si—H radicals may be attached at ends or intermediate positions of the molecular chain. Often, organohydrogenpolysiloxanes having a degree of polymerization equal to or less than 300 are preferably used.

Illustrative examples of the organohydrogenpolysiloxane include diorganopolysiloxanes end-capped with dimethylhydrogensilyl radicals; copolymers consisting of dimethylsiloxy units, methylhydrogensiloxy units, and terminal trimethylsiloxy units; low-viscosity fluids consisting of dimethylhydrogensiloxy units and SiO$_2$ units; 1,3,5,7-tetrahydrogen-1,3,5,7-tetramethyl-cyclotetrasiloxane; 1-propyl-3,5,7-trihydrogen-1,3,5,7-tetramethylcyclotetrasiloxane; and 1,5-dihydrogen-3,7-dihexyl-1,3,5,7-tetramethylcyclotetrasiloxane. The organohydrogenpolysiloxane is preferably used in such amounts that 0.5 to 3.0 moles, more preferably 1.0 to 2.0 moles of Si—H radicals are available per mole of aliphatic unsaturated hydrocarbon radicals in the diorganopolysiloxane (A).

The platinum group metal catalyst is used to catalyze the hydrosilylating reaction between aliphatic unsaturated hydrocarbon radicals in the diorganopolysiloxane (A) and Si—H radicals in the above organohydrogenpolysiloxane. The catalyst is generally used in such amounts as to provide 0.1 to 2,000 ppm, preferably 1 to 1,000 ppm of platinum group metal based on the total weight of the organopolysiloxane (A) and organohydrogenpolysiloxane. Suitable platinum group metal catalysts are platinum based catalysts including fine powder metal platinum catalysts as described in U.S. Pat. No. 2,970,150, chloroplatinic acid catalysts as described in U.S. Pat. No. 2,823,218, platinum-hydrocarbon complex compounds as described in U.S. Pat. Nos. 3,159,601 and 3,159,662, chloroplatinic acid-olefin complex compounds as described in U.S. Pat. No. 3,516,946, and platinum-vinylsiloxane complexes as described in U.S. Pat. Nos. 3,775,452 and 3,814,780.

When a combination of organohydrogenpolysiloxane with platinum group metal catalyst is used as component (C) for the silicone rubber composition to cure through hydrosilylation reaction, reaction regulating agents including methylvinylcyclotetrasiloxane and acetylene alcohols such as ethynyl cyclohexanol may be added for endowing the composition with shelf stability at room temperature and an appropriate pot-life. The curing through hydrosilylation reaction is performed by heating at a temperature of 60 to 400° C. for about 1 minute to about 5 hours.

An organic peroxide may also be used as component (C). In this case, the organic peroxide is generally used in an amount of 0.01 to 3 parts by weight, preferably 0.05 to 1 part by weight per 100 parts by weight of the diorganopolysiloxane (A).

Any of organic peroxides which are commonly used for the curing of organic peroxide curing silicone rubber compositions may be used without particular limits. Suitable examples include benzoyl peroxide, bis(2,4-dichlorobenzoyl) peroxide, di-t-butyl peroxide, 2,5-dimethyl-di-t-butylperoxy-hexane, t-butyl perbenzoate, t-butylperoxyisopropyl carbonate, and dicumyl peroxide. These peroxides may be used alone or in combination of two or more.

When the composition of the invention is cured using an organic peroxide as component (C), it is usually heated at a temperature of 100 to 400° C. for about 1 minute to about 5 hours.

It is also possible to use the combination of organohydrogenpolysiloxane with platinum group metal catalyst and the organic peroxide together as component (C)

The composition (a) from which the substrate is made comprises the silicone rubber composition obtained by mixing the above components, and untreated fumed silica. The term "untreated" fumed silica refers to fumed silica which has not been surface treated. The untreated fumed silica used herein is preferably one having a specific surface area of at least 10 m$^2$/g, more preferably at least 100 m$^2$/g, as measured by the BET method. The specific surface area is most preferably in a range of 100 to 400 m$^2$/g.

Untreated fumed silica is compounded in an amount of 0.5 to 50 parts by weight per 100 parts by weight of the silicone rubber composition comprising components (A), (B) and (C). The preferred amount of untreated fumed silica is 1.0 to 20 parts by weight, and more preferably 1.0 to 10 parts by weight. Too less amounts of untreated fumed silica fail to achieve a certain adhesive effect whereas too much amounts may invite a risk of detracting from the mechanical properties of a molded form of silicone rubber after curing.

The untreated fumed silica may be compounded in the silicone rubber composition by adding the untreated fumed silica to the silicone rubber composition after its preparation and mixing them together. Alternatively, the untreated fumed silica may be added and mixed during the mixing of components (A) and (B) or the mixing of components (A), (B) and (C). In this case, the silicone rubber composition used herein may be any of commercially available products, for example, KE951, FE271, KE971 and KE1950 from Shin-Etsu Chemical Co., Ltd. In compounding untreated fumed silica in a pre-compounded silicone rubber composition, typically a commercial product, a kneading machine such as a two-roll mill, kneader or Banbury mixer may be employed in the case of millable compositions, and a kneading machine such as a planetary mixer or Shinagawa mixer may be employed in the case of liquid compositions. This substrate-forming composition may be heat cured under conditions as described above.

Primer Composition (b)

The primer composition (b) comprises a fluoroalkylene or fluoropolyether compound having at least one alkenyl radical and at least one hydrolyzable silyl radical in the molecule, preferably 1 to 3 alkenyl radicals and 1 to 3 hydrolyzable silyl radicals in the molecule.

The fluoroalkylene or fluoropolyether compound having at least one alkenyl radical and at least one hydrolyzable silyl radical in the molecule is preferably of the general formula (1).

$$A\text{-}(C_2H_4)_q\text{—}(X)_p\text{—}Rf\text{—}(X')_p\text{—}(C_2H_2)_q\text{—}B \qquad (1)$$

Herein A is —CH=CH$_2$, B is a hydrolyzable silyl radical, X and X' are each independently a divalent linking radical, X is —CH$_2$—, —CH$_2$O—, —CH$_2$OCH$_2$— or —Y—NR$^1$—CO— wherein Y is —CH$_2$— or a radical of the following structural formula (Z):

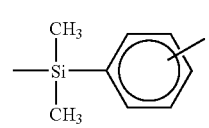

(inclusive of o-, m- and p-positions) and R$^1$ is hydrogen, methyl, phenyl or allyl, X' is —CH$_2$—, —OCH$_2$—, —CH$_2$OCH$_2$— or —CO—NR$^2$—Y'— wherein Y' is —CH$_2$— or a radical of the following structural formula (Z'):

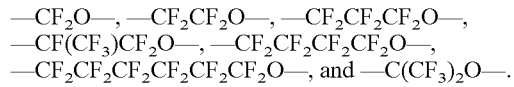

(inclusive of o-, m- and p-positions) and $R^2$ is hydrogen, methyl, phenyl or allyl, p is independently 0 or 1, q is independently 0 or 1, and Rf' is a fluoroalkylene or fluoropolyether-containing radical.

In formula (1), B is a hydrolyzable silyl radical, specifically a radical of $SiR'_xR''_{3-x}$. R' is a monovalent hydrocarbon group having 1 to 8 carbon atoms such as an alkyl group. R'' is a hydrolyzable radical, which is typically selected from halogen atoms such as chlorine, and $C_1$-$C_4$ alkoxy, acetoxy and isopropenoxy radicals, and x is 0, 1 or 2, preferably 0 or 1.

Rf is a fluoroalkylene or fluoropolyether-containing radical. In the case of fluoroalkylene, typical radicals are of the formula:

wherein r is an integer of 2 to 20.

In the case of fluoropolyether, typical radicals are of the formula:

—(Rf—O)$_a$— wherein Rf is a straight or branched fluoroalkylene radical of 1 to 6 carbon atoms, preferably 1 to 3 carbon atoms, and s is an integer of 1 to 500, preferably 2 to 400, more preferably 10 to 200.

Examples of the recurring units —(Rf—O)— are shown below.

—$CF_2O$—, —$CF_2CF_2O$—, —$CF_2CF_2CF_2O$—, —$CF(CF_3)CF_2O$—, —$CF_2CF_2CF_2CF_2O$—, —$CF_2CF_2CF_2CF_2CF_2CF_2O$—, and —$C(CF_3)_2O$—.

Of these, —$CF_2O$—, —$CF_2CF_2O$—, —$CF_2CF_2CF_2O$—, and —$CF(CF_3)CF_2O$— are preferred.

It is understood that the perfluoroalkyl ether structure may consist of recurring units —(Rf—O)— of one type or recurring units of two or more types.

Illustrative examples of Rf include fluoropolyether-containing radicals of the formula (1'):

$$—CF—(OCF_2CF)_m—O—(CF_2)_k—O—(CFCF_2O)_n—CF— \atop CF_3 \quad\quad CF_3 \quad\quad\quad\quad\quad\quad\quad CF_3 \quad\quad CF_3 \tag{1'}$$

wherein k is an integer of 2 to 6, m and n each are an integer of 0 to 200, preferably 5 to 100, having a molecular weight of 400 to 100,000, preferably 1,000 to 50,000.

Illustrative examples of the fluoroalkylene or fluoropolyether compound of formula (1) are shown below.

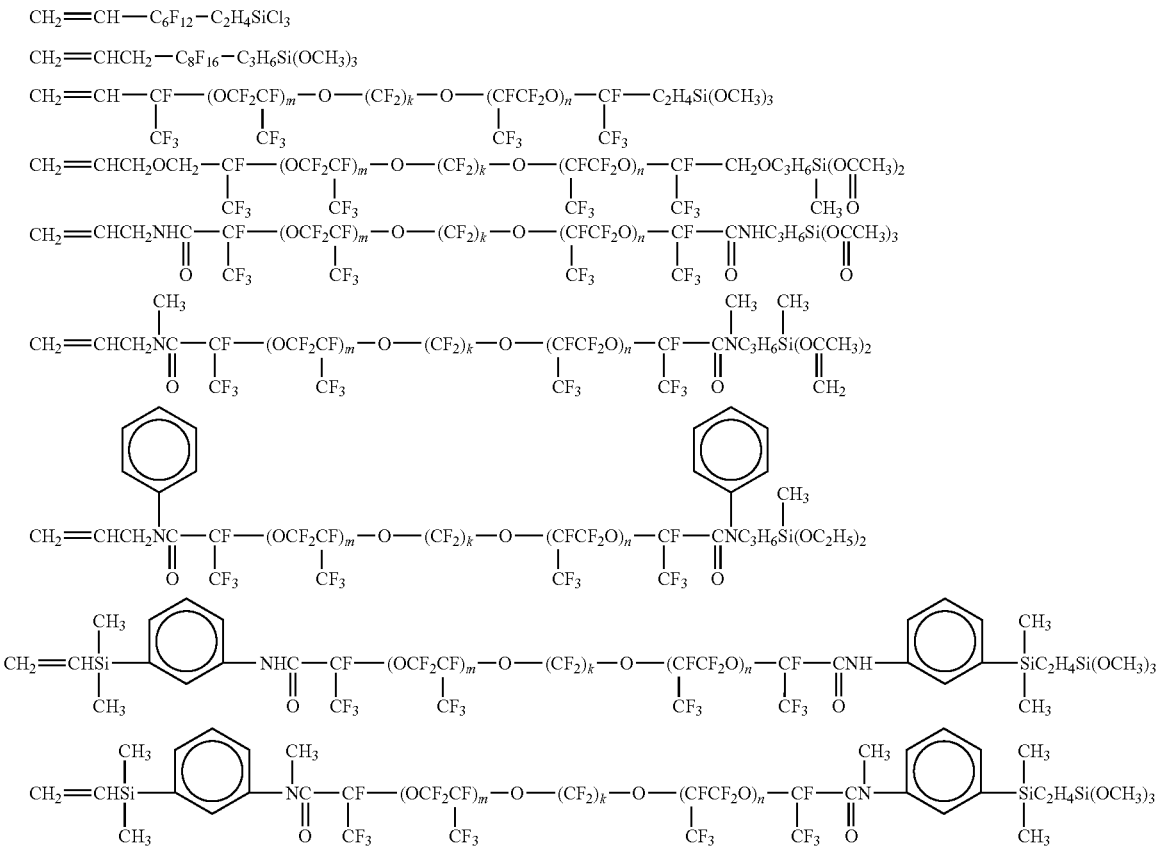

Note that k, m and n are as previously defined for formula (1').

The fluoroalkylene or fluoropolyether compounds may be used alone or in combination of two or more.

While the primer composition (b) comprises a fluoroalkylene or fluoropolyether compound having at least one alkenyl radical and at least one hydrolyzable silyl radical in the molecule as an essential component, it may further include catalysts for promoting hydrolytic reaction, other adhesive additives, solvents, fillers and the like, if necessary.

The catalysts for promoting hydrolytic reaction include organic tin compounds and organic titanic acid ester compounds.

Examples of the organic tin compound include dibutyltin dimethoxide, dibutyltin diacetate, dibutyltin dioctate, dibutyltin dilaurate, dibutyltin dioleate, dibutyltin distearate, dioctyltin diacetate, dioctyltin dilaurate, and diethyltin dioleate.

The organic titanic acid ester is typically selected from among organic titanic acid esters, chelate compounds of titanium, chelate compounds of titanium with silicates, titanate coupling agents, and partial hydrolytic condensates thereof. Examples of suitable organic titanic acid esters include tetraisopropyl titanate, tetra-n-butyl titanate, butyl titanate dimer, tetrakis(2-ethylhexyl) titanate, tetrastearyl titanate, tetramethyl titanate, diethoxybis(acetylacetonato)titanium, diisopropylbis(acetylacetonato)titanium, diisopropoxybis(ethylacetoacetate)titanium, isopropoxy(2-ethyl-1,3-hexanediolato) titanium, di(2-ethylhexoxy)bis(2-ethyl-1,3-hexanediolato)titanium, di-n-butoxybis(triethanolaminato) titanium, titanium tetraacetylacetonate, hydroxybis(lactato) titanium, and partial hydrolytic condensates thereof.

Other adhesive additives include silane coupling agents. Specific examples of the silane coupling agent include tetramethoxysilane, tetraethoxysilane, methyltrimethoxysilane, propyltrimethoxysilane, methyltriethoxysilane, vinyltrimethoxysilane, vinyltriethoxysilane, dimethyldimethoxysilane, phenyltrimethoxysilane, diphenyldimethoxysilane, phenyltriethoxysilane, γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane, p-styryltrimethoxysilane, 3-methacryloxypropylmethyldimethoxysilane, 3-methacryloxypropyltrimethoxysilane, 3-acryloxypropyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, and 3-isocyanatopropyltriethoxysilane.

A dilution solvent may be added to the primer composition for adjusting it to an appropriate viscosity for coating operation. The type of solvent is not particularly limited as long as components of the primer composition are dissolvable therein. Examples of suitable solvents include hydrocarbon solvents such as toluene, xylene, heptane, hexane and petroleum solvents, halogenated solvents such as trichloroethylene, ester solvents such as ethyl acetate and butyl acetate, ketone solvents such as acetone, methyl ethyl ketone and methyl isobutyl ketone, alcohol solvents such as methanol, ethanol and isopropanol, silicone solvents such as hexamethylcyclotrisiloxane, octamethylcyclotetrasiloxane and decamethylcyclopentasiloxane, and fluoro solvents such as trifluoromethylbenzene, 1,3-bistrifluoromethylbenzene and HCFC-225. These solvents may be used alone or in admixture of two or more.

If desired, various fillers may be used in the primer composition. Examples of suitable fillers include wood meal, pulp, cotton chips, asbestos, glass fibers, carbon fibers, mica, walnut shell flour, rice hull flour, graphite, diatomaceous earth, china clay, fumed silica, precipitated silica, silicic anhydride, carbon black, calcium carbonate, magnesium carbonate, clay, talc, titanium oxide, cerium oxide, ground quartz, finely divided aluminum, iron oxide, flint powder, and zinc powder. These fillers may be used alone or in admixture of two or more.

To the primer composition, various other additives may be added if necessary. Suitable additives include antioxidants, radical inhibitors, metal deactivating agents, ozone degradation preventing agents, storage stability improvers, tackifiers, pigments, and dyes.

Typical of the primer composition described above is the composition described in U.S. Pat. No. 7,081,508 (or JP-A 2004-331704).

Fluoroelastomer Composition (c)

The heat-curable perfluoropolyether elastomer composition (c) is typically a heat-curable elastomer composition comprising a polymer having at least two alkenyl radicals in a molecule and a perfluoropolyether structure in its backbone as a main component, and a compound having at least two, preferably at least three SiH radicals in a molecule, and a platinum group catalyst whereby heat cure takes place through hydrosilylation reaction. Heat-curable elastomer compositions of this type are disclosed in Japanese Patent Nos. 2,990,646, 3,413,713, 3,239,717, and 3,077,536. They are commercially available, for example, under the trade name of SIFEL series from Shin-Etsu Chemical Co., Ltd.

One preferred example of the heat-curable perfluoropolyether elastomer composition (c) is a crosslinkable fluororubber composition comprising (D) a polymer having at least two alkenyl radicals in the molecule and a divalent perfluoropolyether structure in its backbone, (E) a reinforcing filler, and (F) an effective amount of a crosslinker having hydrosilyl radicals in the molecule and capable of addition reaction.

The alkenyl-containing perfluoro compound (D) is preferably a linear fluoropolyether compound having the general formula (2):

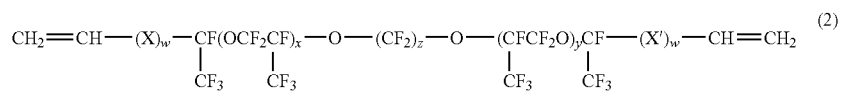

wherein X is —$CH_2$—, —$CH_2O$—, —$CH_2OCH_2$— or —Y—NR—CO— wherein Y is —$CH_2$— or a radical of the following structural formula (Z):

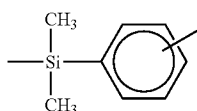

(Z)

(inclusive of o-, m- and p-positions) and R is hydrogen, methyl, phenyl or allyl, X' is —CH$_2$—, —OCH$_2$—, —CH$_2$OCH$_2$— or —CO—NR—Y'— wherein Y' is —CH$_2$— or a radical of the following structural formula (Z'):

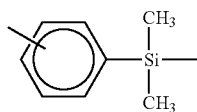

(Z')

(inclusive of o-, m- and p-positions) and R is as defined above, w is independently 0 or 1, z is an integer of 2 to 6, x and y are each independently an integer of 0 to 200, preferably an integer of 2 to 180, and more preferably an integer of 10 to 150.

The reinforcing filler (E) is an important component associated with the durability during regenerating step after dust deposition. Examples of the filler include fumed silica, wet silica, ground silica, calcium carbonate, diatomaceous earth, carbon black, and various powdered metal oxides, which may optionally be treated with various surface treating agents. Inter alia, fumed silica is preferred for improved mechanical strength. Fumed silica treated with silane surface treating agents is more preferred for improved dispersion.

Preferably, the reinforcing filler (E) is added in an amount of 1 to 200 parts by weight per 100 parts by weight of component (D). An amount of 5 to 100 parts by weight is more preferred for the stabilization of mechanical properties. Outside the range, too less amounts of the reinforcing filler may fail to provide strength whereas too much amounts may lead to a buildup of viscosity to interfere with working and processing.

Component (F) is a crosslinker for curing the polymer (D), that is, a crosslinker having hydrosilyl radicals in the molecule and capable of addition reaction. The preferred crosslinkers are organosilicon compounds, typically, organohydrogenpolysiloxanes, having at least two, preferably at least three silicon-bonded hydrogen atoms in the molecule. In view of the compatibility with and dispersion in component (D) and uniformity after curing, organosilicon compounds further having at least one fluorinated monovalent hydrocarbon radical in the molecule are more preferred.

In the heat-curable perfluoropolyether elastomer composition (c), a catalyst may also be compounded for promoting the addition reaction between alkenyl radicals in component (D) and hydrosilyl radicals in component (F). The hydrosilylating reaction catalysts are typically noble metal compounds which are expensive. Platinum group metal compounds such as platinum and platinum compounds are often used since they are readily available. This curing catalyst may be selected from those described for the composition (a).

The crosslinker (F) is added in a sufficient amount to cure the polymer (D), preferably such that the molar ratio of hydrosilyl radicals in component (F) to alkenyl radicals in component (D) is in a range from 0.5 to 2.0, more preferably from 0.8 to 1.5. The platinum group metal compounds such as platinum and platinum compounds are preferably added in such amounts as to provide 0.1 to 1,000 ppm, more preferably 1 to 500 ppm of platinum group metal based on the weight of component (D).

In the perfluoropolyether elastomer composition (c), other additives may be compounded insofar as this does not compromise the object of the invention.

The perfluoropolyether elastomer composition (c) may be prepared by mixing the above-described components in a customary manner.

Integrated Rubber Article

In the method for preparing a rubber article according to the invention, a substrate (or molded part) is first prepared by heat curing the substrate-forming composition (a) in a predetermined way. Specifically, the composition is press cured at 100 to 200° C., more specifically 120 to 180° C., for about 3 to 20 minutes, more specifically about 5 to 15 minutes, using a mold and a press, and then post-cured at 150 to 200° C. for about 0.5 to 4 hours in an oven or the like. From the standpoints of adhesion and adhesion durability, it is preferred that the composition be kept in the press-cured stage and after integration, subjected to post-curing.

Next, the primer composition (b) is coated to the surface of the cured silicone rubber (a). The coating may be carried out by any of commonly used coating techniques, for example, brush coating, spray coating, wire bar, blade, roll coating, and dipping techniques. After coating, the primer composition is dried in air at room temperature for 1 to 30 minutes, preferably 2 to 15 minutes. Merely after air drying, the process may proceed to the subsequent step. However, air drying is often followed by baking for enhancing the adhesion between the primer and the silicone rubber. The baking step is typically carried out by heating at 50 to 180° C., preferably 80 to 150° C. for 1 to 60 minutes, preferably 5 to 30 minutes. The coating weight of the primer composition (b) may be in a range of 0.01 to 5.0 g/m$^2$, preferably 0.1 to 2.0 g/m$^2$ after coating although it varies with the concentration of the primer solution and the surface state of the silicone rubber.

Finally, on the primer-coated silicone rubber, the heat-curable perfluoropolyether elastomer composition (c) is molded and heat cured whereby a molded article bonded and integrated to the silicone rubber is obtained. The molding of the fluoroelastomer composition may be by a standard technique using a mold and a press. The heat curing of the fluoroelastomer composition may include press curing at 100 to 180° C., preferably 120 to 150° C., and post-curing at 150 to 200° C. for 0.5 to 4 hours in an oven or the like.

The rubber articles thus obtained find use in a variety of applications, specifically as automotive rubber parts where oil resistance is required, for example, diaphragms such as fuel regulator diaphragms, pulsation damper diaphragms, oil pressure switch diaphragms, and EGR diaphragms, valves such as canister valves and power control valves, O-rings such as quick connector O-rings and injector O-rings, and seal members such as oil seals and cylinder head gaskets; chemical plant rubber parts, for example, pump diaphragms, valves, O-rings, hoses, packing members, oil seals, gaskets and other seal members; rubber parts for ink jet printers, rubber parts for semiconductor manufacturing lines, for example, diaphragms, valves, O-rings, packing members, gaskets and seal members for apparatus to come in contact with chemicals, and valves which are required to have low friction and abrasion resistance; rubber parts for analytical and experimental equipment, such as pump diaphragms, valves, seal members (e.g., O-rings and packing); rubber parts for medical equipment, such as pumps, valves and joints; and tent coating materials, sealants, molded parts, extruded parts, coats, copier roll materials, electrical moisture-proof coatings, sensor potting materials, fuel cell sealing materials, and laminate rubber fabrics.

EXAMPLE

Examples of the invention are given below by way of illustration and not by way of limitation. In Examples, all parts are by weight.

Compositions Used in Examples and Comparative Examples

Silicone Rubber as Cured (A):
  A silicone rubber sheet was prepared by adding 2 parts of fumed silica "Aerosil A-300" (Nippon Aerosil Co., Ltd., untreated, BET surface area 300 m²/g) to 100 parts of peroxide crosslinking type standard composition obtained by blending organic peroxide to silicone rubber base compound KE951 (Shin-Etsu Chemical Co., Ltd.), milling on a two-roll mill, placing the compound in a sheet-forming mold of 10 cm×2.5 cm×2 mm (thick), and press curing at 165° C. for 10 minutes.

Silicone Rubber as Cured (B):
  A silicone rubber sheet was prepared by adding 2 parts of fumed silica "Aerosil A-300" (Nippon Aerosil Co., Ltd., untreated, BET surface area 300 m² μg) to 100 parts of hydrosilylation addition crosslinking type standard composition obtained by blending hydrosilylation curing agent to silicone rubber base compound KE951 (Shin-Etsu Chemical Co., Ltd.), milling on a two-roll mill, placing the compound in a sheet-forming mold of 10 cm×2.5 cm×2 mm (thick), and press curing at 150° C. for 10 minutes.

Fluorosilicone Rubber as Cured (C):
  A fluorosilicone rubber sheet was prepared by adding 2 parts of fumed silica "Aerosil A-300" (Nippon Aerosil Co., Ltd., untreated, BET surface area 300 m²/g) to 100 parts of peroxide crosslinking type standard composition obtained by blending organic peroxide to silicone rubber base compound FE271 (Shin-Etsu Chemical Co., Ltd.), milling on a two-roll mill, placing the compound in a sheet-forming mold of 10 cm×2.5 cm×2 mm (thick), and press curing at 165° C. for 10 minutes.

Silicone Rubber as Cured (D):
  A silicone rubber sheet was prepared by directly placing peroxide crosslinking type standard composition obtained by blending organic peroxide to silicone rubber base compound KE951 (Shin-Etsu Chemical Co., Ltd.), in a sheet-forming mold of 10 cm×2.5 cm×2 mm (thick), and press curing at 165° C. for 10 minutes.

Fluorosilicone Rubber as Cured (E):
  A fluorosilicone rubber sheet was prepared by directly placing peroxide crosslinking type standard composition obtained by blending organic peroxide to silicone rubber base compound FE271 (Shin-Etsu Chemical Co., Ltd.), in a sheet-forming mold of 10 cm×2.5 cm×2 mm (thick), and press curing at 165° C. for 10 minutes.

Primer Composition (F):
  Composition of Preparation Example 1 described below.

Perfluoropolyether Elastomer Composition (G):
  Hydrosilylation addition crosslinking type standard composition obtained by blending hydrosilylation curing agent to SIFEL 3155 (Shin-Etsu Chemical Co., Ltd.).

Preparation Example 1

A vessel equipped with a stirrer was charged with 10 parts of a fluoropolyether compound of formula (3), 2.0 parts of tetra-n-butoxytitanate, 1.0 part of tetraethoxysilane, 1.5 parts of γ-glycidoxypropyltrimethoxysilane, 0.1 part of dibutyltin dimethoxide, 50 parts of 1,3-bistrifluoromethylbenzene, and 30 parts of methyl isobutyl ketone. The ingredients were homogeneously dissolved, obtaining Primer composition (F).

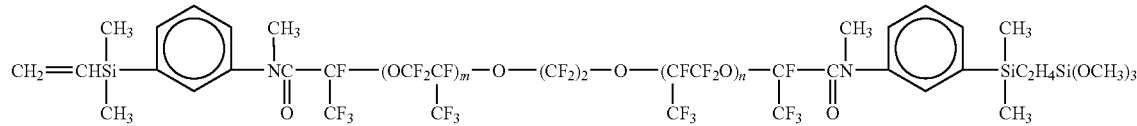

(3)

average of m+n=13

Manufacture of Integrally Molded Articles

On a silicone rubber sheet (A, B, C, D or E, 10 cm×2.5 cm×2 mm thick), Primer composition (F) is coated. The coated area is limited to a half area (5 cm×2.5 cm) of the sheet surface. The primer coating is air dried at room temperature for 10 minutes and heat treated at 120° C. for 10 minutes.

The primer-coated sheet is placed in a mold of 10 cm×2.5 cm×4 mm (thick). Perfluoropolyether elastomer composition (G) is cast into the mold and cured for crosslinkage at 150° C. for 10 minutes using a rubber press. It is then cured in an oven at 200° C. for 4 hours. This results in a half-area-bonded test piece as shown in FIG. 1. The test piece in FIG. 1 includes a perfluoropolyether rubber layer 1, a silicone rubber layer 2, and a primer layer 3.

Evaluation of Interface Bond (1) Peeling
  In the test piece shown in FIG. 1, the perfluoropolyether rubber layer 1 and the silicone rubber layer 2 were separated by pulling them apart from the unbonded right half. The rubber peeling mode at the interface was evaluated.
  ○: rubber cohesive failure, material interface remains stable
  x: peeling without cohesive failure at interface (2) Solvent Swell
  The test piece was immersed in toluene (for silicone) or methyl ethyl ketone (for fluorosilicone) for 24 hours whereby only the rubber on one side was swollen. The swollen state was evaluated.
  ○: stable rubber interface state where one side rubber swelled, but did not peel apart
  x: peeled within 24 hours Examples 1 to 3

Integrally molded articles manufactured from the silicone rubber and the perfluoropolyether rubber in the combination shown in Table 1 were evaluated, with the results shown in Table 1. The integrally molded articles had a stable interface, indicating a satisfactory bond.

Comparative Examples 1 to 2

Integrally molded articles manufactured from the silicone rubber and the perfluoropolyether rubber in the combination shown in Table 1 were evaluated, with the results shown in Table 1. Poor interfacial bond was observed because of the absence of untreated fumed silica in the silicone rubber.

TABLE 1

|  | Example | | | Comparative Example | |
|---|---|---|---|---|---|
|  | 1 | 2 | 3 | 1 | 2 |
| Silicone rubber | A | B | C | D | E |
| Fumed silica, added or not | added | added | added | not | not |
| Primer | F | F | F | F | F |
| Perfluoropolyether rubber | G | G | G | G | G |
| Peeling | ○ | ○ | ○ | X | X |
| Swell in toluene | ○ | ○ | — | X | — |
| Swell in MEK | — | — | ○ | — | X |

Japanese Patent Application No. 2006-054797 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a rubber article, comprising the steps of:
    adding an untreated fumed silica in an amount of 0.5 to 50 parts by weight into 100 parts by weight of a heat-curable silicone rubber composition and mixing them together to form a substrate-forming composition (a), said heat-curable silicone rubber composition comprising (A) 100 parts by weight of diorganopolysiloxane having the average compositional formula (I):

$$(R^{11})_a SiO_{(4-a)/2} \quad (I)$$

wherein $R^{11}$ is a substituted or unsubstituted monovalent hydrocarbon radical, and a is a number in the range: $1.95 \leq a \leq 2.05$, 0.01 to 15 mol % of the entire silicon-bonded $R^{11}$ radicals being a monovalent aliphatically unsaturated hydrocarbon radical, (B) 5 to 200 parts by weight of a surface-treated reinforcing filler, and (C) an effective amount of a crosslinker selected from a combination of organohydrogenpolysiloxane with a platinum group metal catalyst, and an organic peroxide,
    heat curing a substrate-forming composition (a) to form a silicone rubber substrate,
    applying a primer composition (b) comprising a fluoroalkylene or fluoropolyether compound having at least one alkenyl radical and at least one hydrolyzable silyl radical in the molecule onto a surface of the substrate, and
    disposing thereon a heat-curable perfluoropolyether elastomer composition (c) and curing the composition for integration.

2. The method of claim 1, wherein in said primer composition (b), the fluoroalkylene or fluoropolyether compound having at least one alkenyl radical and at least one hydrolyzable silyl radical in the molecule has the general formula (1):

$$A-(C_2H_4)_q-(X)_p-Rf-(X')_p-(C_2H_4)_q-B \quad (1)$$

wherein A is —CH=CH$_2$, B is a hydrolyzable silyl radical, X and X' are each independently a divalent linking radical, X is —CH$_2$—, —CH$_2$O—, —CH$_2$OCH$_2$— or —Y—NR$^1$—CO— wherein Y is —CH$_2$— or a radical of the following structural formula (Z):

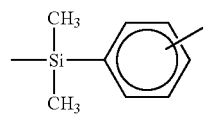
(Z)

(inclusive of o-, m- and p-positions) and R$^1$ is hydrogen, methyl, phenyl or allyl, X' is —CH$_2$—, —OCH$_2$—, —CH$_2$OCH$_2$— or —CO—NR$^2$—Y'— wherein Y' is —CH$_2$— or a radical of the following structural formula (Z'):

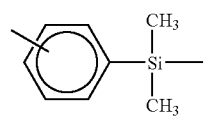
(Z')

(inclusive of o-, m- and p-positions) and R$^2$ is hydrogen, methyl, phenyl or allyl, p is independently 0 or 1, q is independently 0 or 1, and Rf is a fluoroalkylene or fluoropolyether-containing radical.

3. The method of claim 2 wherein Rf is —C$_r$F$_{2r}$— wherein r is an integer of 2 to 20 or a fluoropolyether-containing radical of the formula (1'):

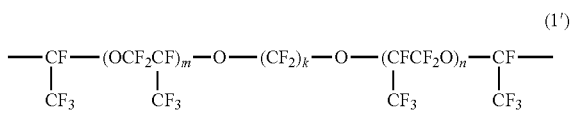
(1')

wherein k is an integer of 2 to 6, m and n each are an integer of 0 to 200.

4. The method of claim 1, wherein said heat-curable perfluoropolyether elastomer composition (c) comprises a polymer having at least two alkenyl radicals in the molecule and a perfluoropolyether structure in the backbone, a compound having at least two SiH radicals in the molecule, and a platinum group catalyst.

5. The method of claim 1 wherein the untreated fumed silica is added after the preparation of the heat-curable silicone rubber composition.

6. The method of claim 1 wherein the diorganopolysiloxane (A) is selected from the group consisting of compounds having the general formula (II):

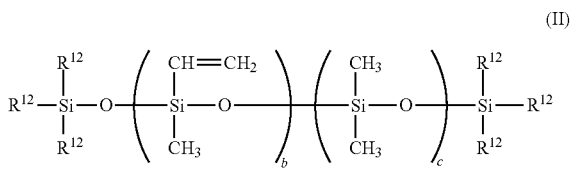
(II)

wherein b is an integer of at least 1, c is an integer of at least 1, b+c is an integer of at least 1,000, with the proviso that b and c have such values that a proportion of —CH=CH$_2$ radicals in all silicon-bonded organic radicals is in a range of 0.01 to 15 mol %, and R$^{12}$ which may be the same or different is a methyl, vinyl or hydroxyl radical; compounds having the general formula (III):

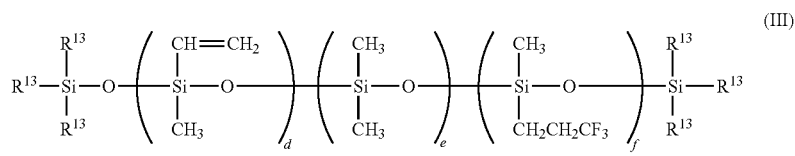

wherein d is an integer of at least 1, e is an integer of at least 1, f is an integer of at least 1, d+e+f is an integer of at least 1,000, with the proviso that d, e and f have such values that a proportion of —CH=CH$_2$ radicals in all silicon-bonded organic radicals is in a range of 0.01 to 15 mol %, and R$^{12}$ which may be the same or different is a methyl, vinyl, 3,3,3-trifluoropropyl or hydroxyl radical; and compounds having the general formula (IV):

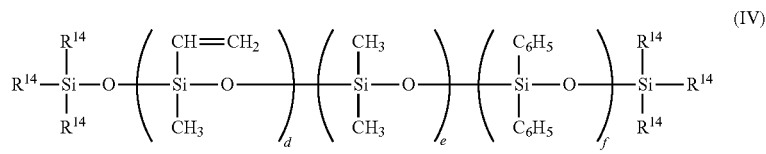

wherein d is an integer of at least 1, e is an integer of at least 1, f is an integer of at least 1, d+e+f is an integer of at least 1,000, with the proviso that d, e and f have such values that a proportion of —CH=CH$_2$ radicals in all silicon-bonded organic radicals is in a range of 0.01 to 15 mol %, and R$^{14}$ which may be the same or different is a methyl, vinyl, phenyl or hydroxyl radical.

7. The method of claim 1 wherein the reinforcing filler (B) is selected from the group consisting of fumed silica, precipitated silica, fused silica, quartz flour, diatomaceous earth, aluminum silicate, titanium oxide, zinc oxide, iron oxide, alumina, calcium carbonate, zinc carbonate, and carbon black, and a surface treating agent for surface treating the reinforcing filler is selected from the group consisting of chlorosilanes, organosilazanes, and silicone oils of the general formula:

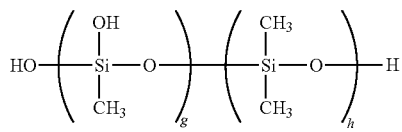

wherein g and h are numbers in the range: g>0, h>1, and 1<g+h <100.

8. The method of claim 1 wherein the primer composition (b) further comprising an organic tin compound or an organic titanic acid ester compound.

9. The method of claim 1 wherein the heat-curable perfluoropolyether elastomer composition (c) comprises (D) a polymer having at least two alkenyl radicals in the molecule and a divalent perfluoropolyether structure in its backbone, (E) a reinforcing filler, and (F) an effective amount of a crosslinker having hydrosilyl radicals in the molecule and capable of an addition reaction.

10. The method of claim 9 wherein the alkenyl-containing perfluoro compound (D) is a linear fluoropolyether compound having the general formula (2):

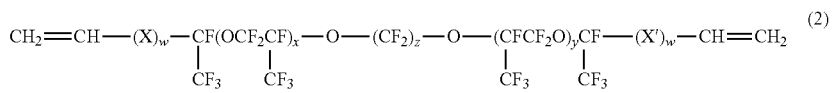

wherein X is —CH$_2$—, —CH$_2$O—, —CH$_2$OCH$_2$— or —Y—NR—CO— wherein Y is —CH$_2$ or a radical of the following structural formula (Z):

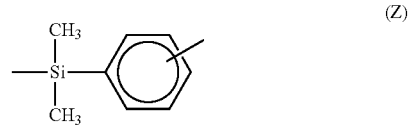

and R is hydrogen, methyl, phenyl or allyl, X' is —CH$_2$—, —OCH$_2$—, —CH$_2$OCH$_2$— or —CO—NR—Y'— wherein Y' is —CH$_2$— or a radical of the following structural formula (Z'):

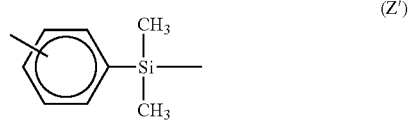

and R is as defined above, w is independently 0 or 1, z is an integer of 2 to 6, x and y are each independently an integer of 0 to 200.

11. The method of claim 9 wherein the reinforcing filler (E) is selected from the group consisting of fumed silica, wet silica, ground silica, calcium carbonate, diatomaceous earth, carbon black, and various powdered metal oxides, which may be treated with a surface treating agent.

12. The method of claim 9 wherein the crosslinker (F) is an organohydrogenpolysiloxane having at least two silicon-bonded hydrogen atoms and at least one fluorinated monovalent hydrocarbon radical in the molecule, and a platinum group metal compound.

* * * * *